United States Patent

Stoves et al.

[11] Patent Number: 5,580,589
[45] Date of Patent: Dec. 3, 1996

[54] APPARATUS FOR BENDING PLASTIC PIPE

[75] Inventors: Derek Stoves, St. John's; William E. Robinson, Chapel Park, both of United Kingdom

[73] Assignee: British Gas plc, London, England

[21] Appl. No.: 244,790
[22] PCT Filed: Oct. 25, 1993
[86] PCT No.: PCT/GB93/02192
 § 371 Date: Jun. 13, 1994
 § 102(e) Date: Jun. 13, 1994
[87] PCT Pub. No.: WO94/10496
 PCT Pub. Date: May 11, 1994

[30] Foreign Application Priority Data

Oct. 26, 1992 [GB] United Kingdom ............ 9222410

[51] Int. Cl.⁶ ............... B29C 63/34; F16L 55/18
[52] U.S. Cl. ............... 425/392; 405/154; 425/11
[58] Field of Search ............... 405/154, 174; 425/11, 392

[56] References Cited

U.S. PATENT DOCUMENTS

| | | | |
|---|---|---|---|
| 4,504,171 | 3/1985 | Florence, Jr. | 405/154 |
| 4,668,125 | 5/1987 | Long, Jr. | 405/154 |
| 4,898,498 | 2/1990 | Akesaka | 405/154 |
| 4,998,871 | 3/1991 | Ledoux | 425/392 |
| 5,092,756 | 3/1992 | Gau et al. | 425/392 |
| 5,114,634 | 5/1992 | McMillan | 264/28 |
| 5,340,524 | 8/1994 | McMillan et al. | 405/174 |
| 5,348,459 | 9/1994 | Sauron et al. | 425/392 |

FOREIGN PATENT DOCUMENTS

| | | |
|---|---|---|
| 0367400 | 5/1990 | European Pat. Off. |
| 0445326 | 9/1991 | European Pat. Off. |
| 2313619 | 12/1976 | France. |
| 4109663 | 9/1992 | Germany. |
| 2084686 | 4/1982 | United Kingdom. |
| 2152178 | 7/1985 | United Kingdom. |
| 2152177 | 7/1985 | United Kingdom. |
| 2261687 | 5/1993 | United Kingdom. |

*Primary Examiner*—James P. Mackey
*Attorney, Agent, or Firm*—Larson & Taylor

[57] ABSTRACT

The apparatus comprises a frame having a die pivotally connected to it at one end and anchorage means pivotally connected to it at the other end. The anchorage means carries a first roller. A second roller is adjustable transverse to the frame. A pipe pusher is integral with the die. The frame has adjustable legs to set the angle of the fame. A plastic pipe is pulled through the die and through the host pipe and is bent between the first roller, the second roller and the die. The frame fully contains the reactions arising owing to the bending of the pipe.

5 Claims, 5 Drawing Sheets

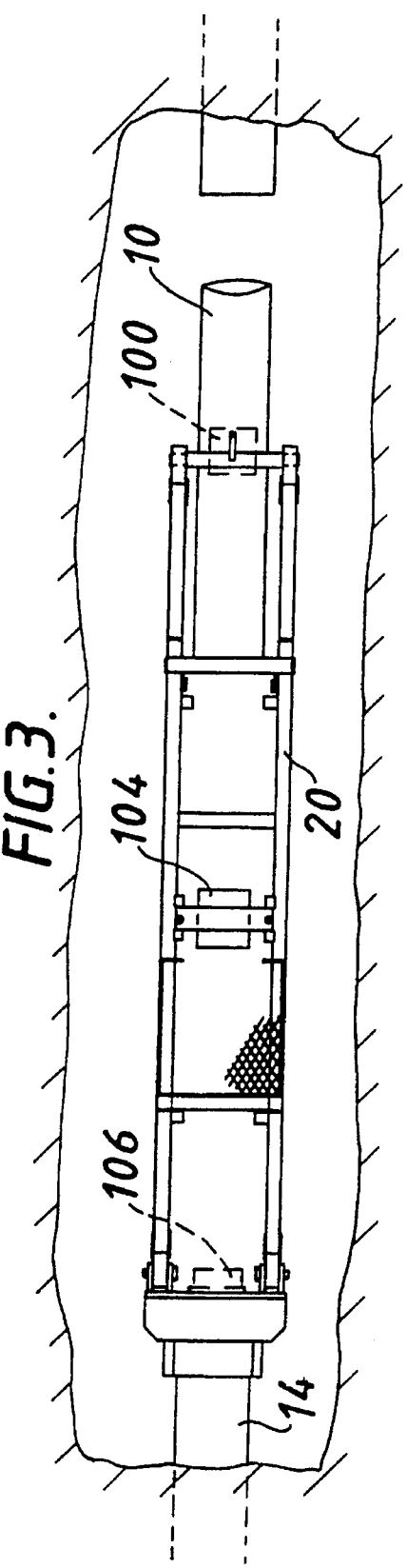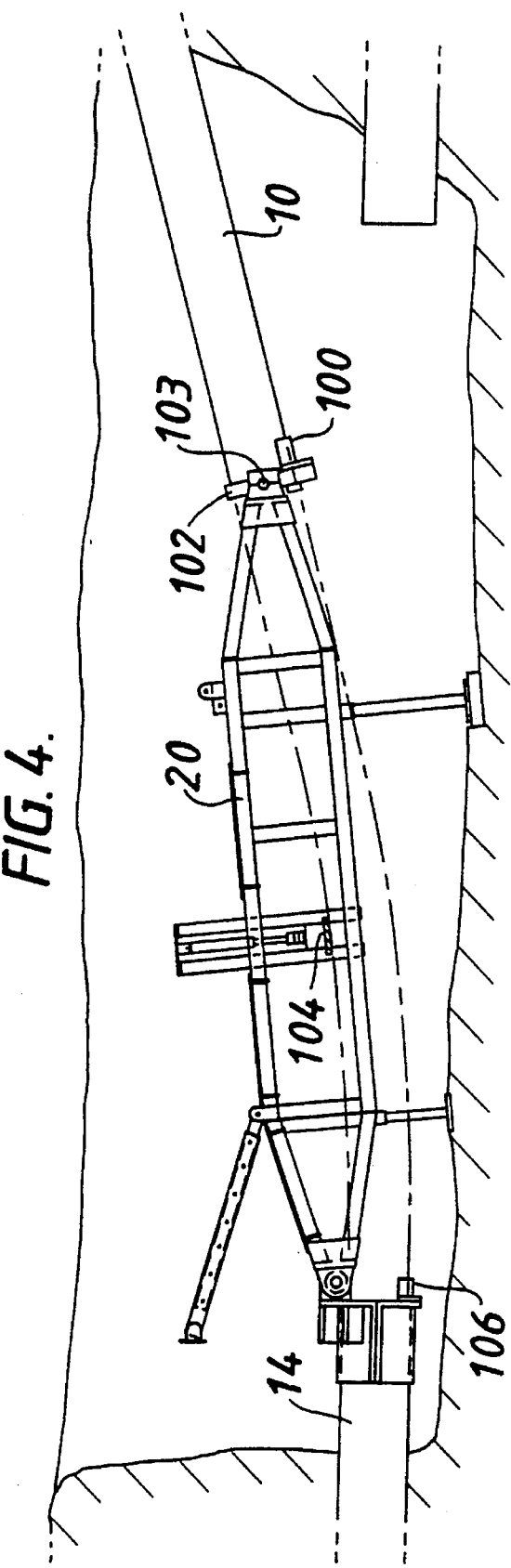

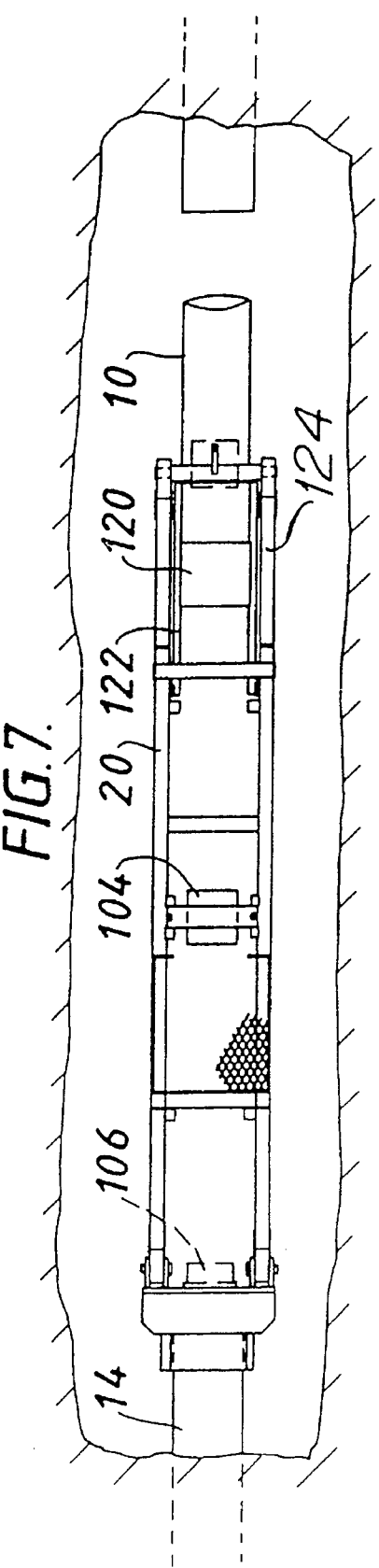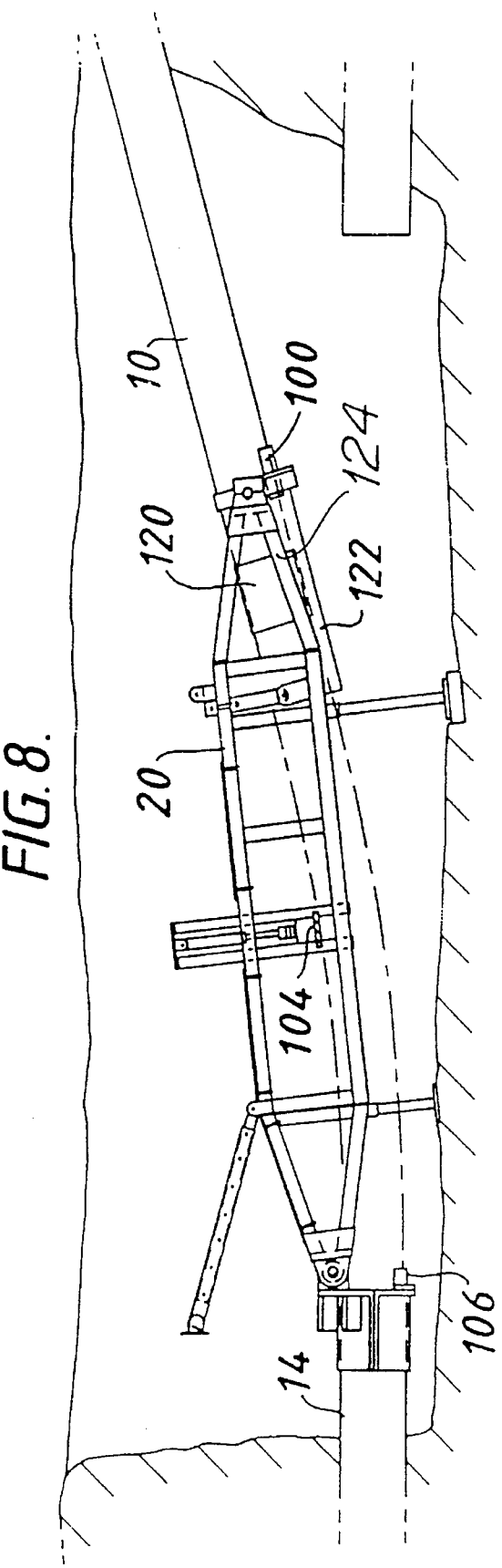

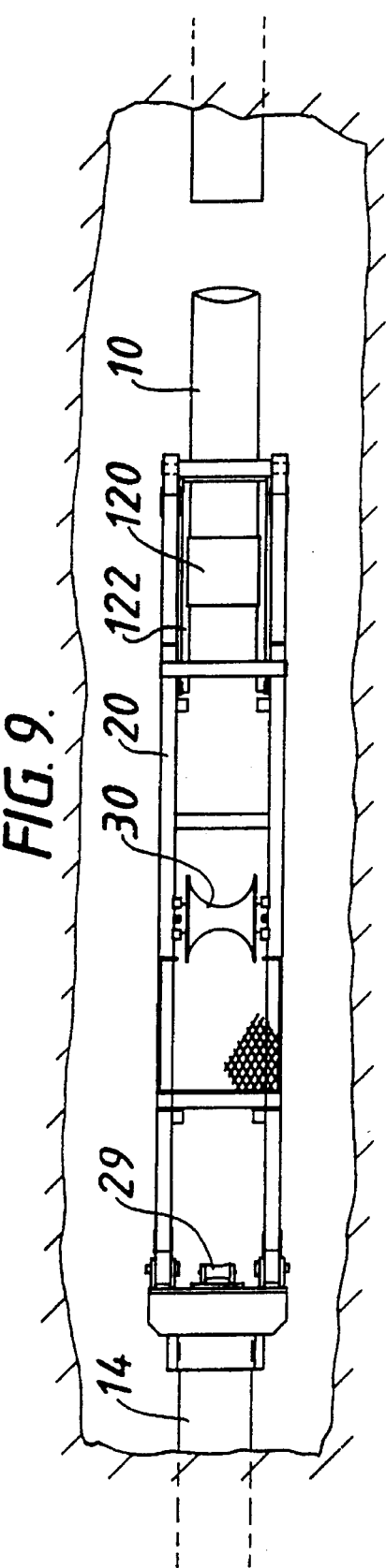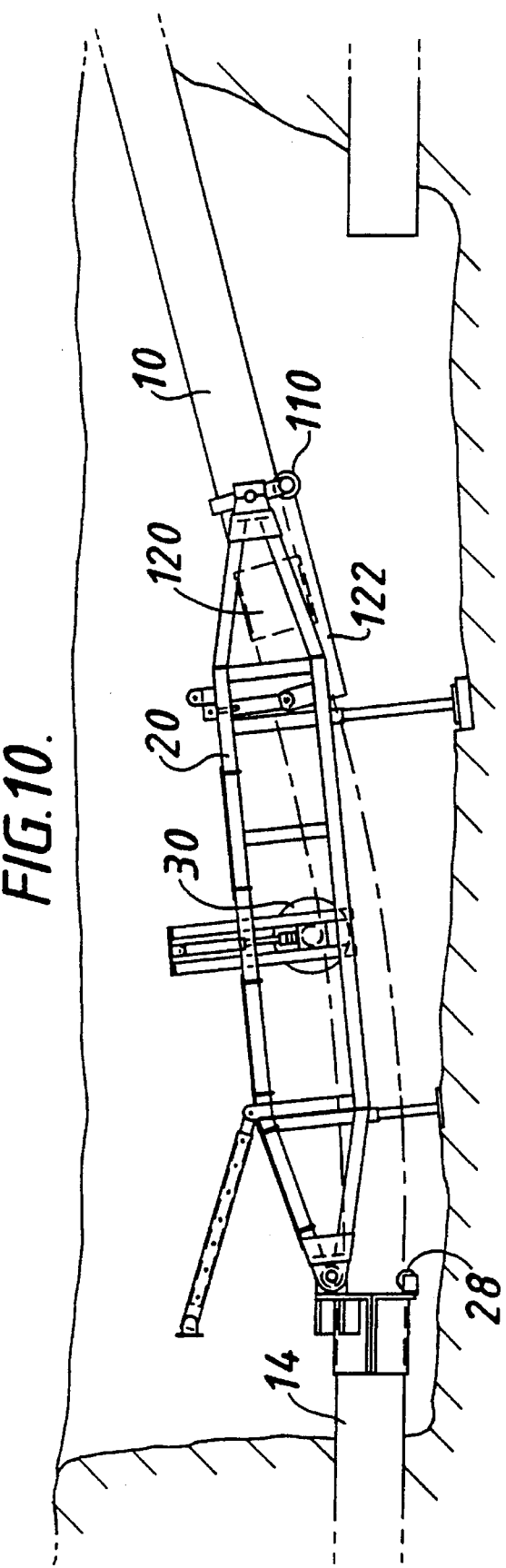

5,580,589

APPARATUS FOR BENDING PLASTIC PIPE

BACKGROUND OF THE INVENTION

The invention relates to apparatus for bending plastic pipe.

Equipment is known by which a polyethylene pipe is pulled through a die and through a host pipe, for example a gas main. The die reduces the diameter of the polyethylene pipe which, when the pulling force is removed, recovers its diameter and becomes a close fit within the host pipe. Such equipment was also used in which a pipe pusher was incorporated, the pusher repeatedly gripping the pipe and pushing the pipe into the host pipe.

In the known equipment, the host pipe was required to react to the bending of the polyethylene pipe as it entered the host pipe. This added to the frictional resistance and the total force required to pull the polyethylene pipe through the host pipe.

The invention provides apparatus for bending plastic pipe which is useful in methods in which the plastic pipe is passed into a host pipe whether the plastic pipe is first reduced in diameter by passing it through a die or alternatively the plastic pipe is installed in the host pipe as a loose liner.

SUMMARY OF THE INVENTION

Apparatus for bending plastic pipe before it enters a host pipe, according to the invention, comprises a structure which is elongated in a direction in which, in use, plastic pipe enters host pipe and which has a first end and a second end, anchorage means for securing said elongate structure to an entry end of a host pipe and pivotally connected to said structure at said second end thereof about a first horizontal axis, first, second and third guides intended for engagement, respectively, with an under surface, a top surface and the under surface of said plastic pipe, said first guide being mounted on said structure at said first end thereof, said third guide being mounted on said structure of said second end thereof and said second guide being mounted on said structure intermediate said first and third guides, said guides being profiled to accommodate said plastic pipe and said second guide being adjustable between an upper retracted position and a lower working position, and means connected to said structure engageable with the ground and adjustable for setting the inclination, relative to the ground, of said structure about said first horizontal axis,

BRIEF DESCRIPTION OF THE DRAWINGS

Embodiments of the apparatus will now be described with reference to the accompanying drawings in which:

FIGS. 3 and 4, 5 and 6, 7 and 8 and 9 and 10 correspond to FIG. 1 but show second, third, fourth and fifth embodiments, respectively, useful where the pipe is installed as a loose liner in a host pipe.

DESCRIPTION OF PREFERRED EMBODIMENTS

Figure 1:
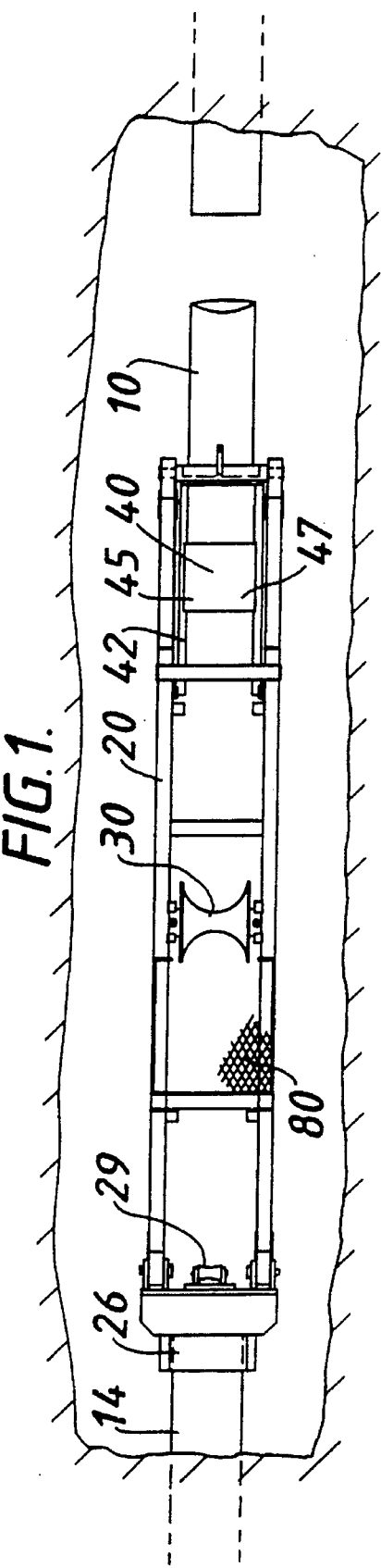
FIG. 1 is a plan of a first embodiment of apparatus useful where the diameter of the plastic pipe is reduced by passing the pipe through a die.
Figure 2:
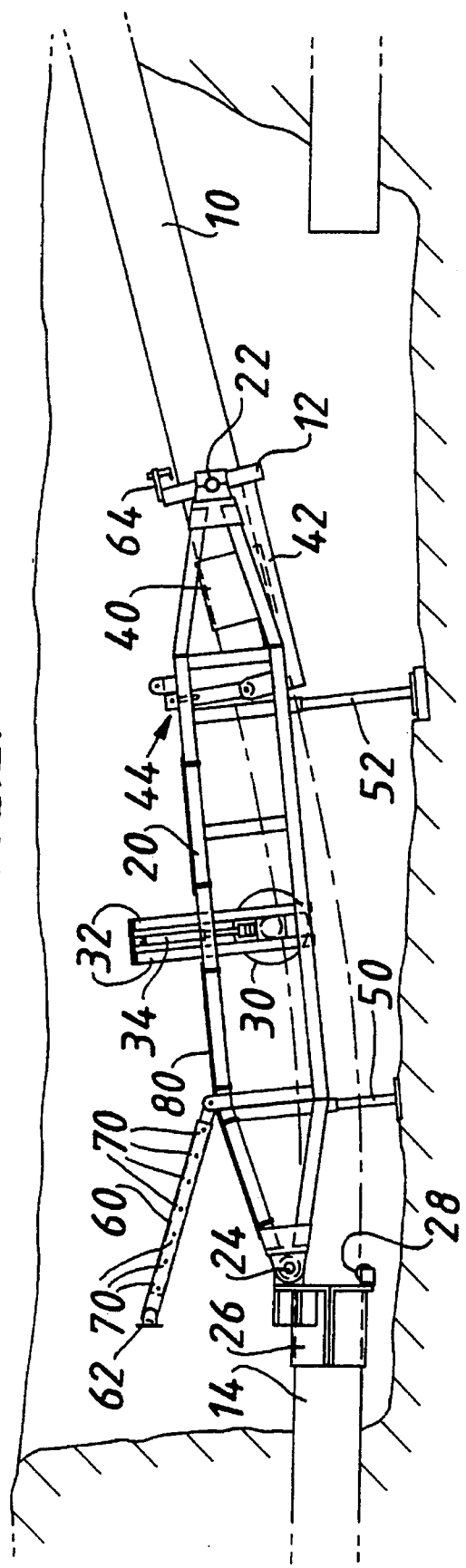
FIG. 2 is a side elevation of the apparatus shown in FIG. 1.

FIG. 1 and 2 show a pipe 10 of polyethylene being passed through a die 12 and then into a host pipe 14 which is a former gas main. The pipe 10 is reduced in diameter by the die 12 and when it is fully inserted in the host main 14 the pulling force applied to the leading end of the pipe 10 is removed. The pipe 10 progressively recovers its diameter and eventually is a close fit within the host pipe 14. The host pipe 14 is shown having been exposed by an excavation in the earth. The pipe 14 has had a section removed from it and the other end of the pipe is shown to the right in FIG. 2.

FIGS. 1 and 2 show a structure 20 which is elongated in the direction in which the pipe 10 passes through the die 12. The die 12 is pivotally mounted on one end of the structure 20 (the first end) about a horizontal axis 22.

The other end of the structure 20 (the second end) is pivotally connected about a horizontal axis at 24 to anchorage means 26. The anchorage means 26 is secured to the protruding end of the host main 14. The anchorage means 26 carries a horizontal roller 28 which engages the under surface of the pipe 10 (see FIG. 2).

The anchorage means 26 also carries another horizontal roller 29 (see FIG. 1) which can engage the top surface of the pipe 10.

A further horizontal roller 30 is carried by the structure 20 intermediate its ends. The roller 30 is mounted in vertical slides 32 and is adjustable transversely to the length of the structure 20 (in a vertical plane extending parallel to the length of the structure 20) by means of a hydraulic or pneumatic cylinder 34. The roller 30 engages the top surface of the pipe 10. The roller 30 has two extreme positions which may be set by the cylinder 34: an upper, retracted position and a lower, working position.

The die 12, the roller 30 and the roller 28 form, respectively, first, second and third guides for the pipe 10 as it passes towards the host pipe 14.

A pipe pusher 40 has a base frame 42 rigidly connected to the die 12. Means 44 are provided for rigidly connecting (in a releasable manner) the frame 42 to the structure 20. The pipe pusher 40 includes two jaws 45, 47 each in the form of a half-cylinder which can be engaged with the pipe 10 (and disengaged therefrom) by one or more hydraulic or pneumatic cylinders (not shown). The jaws 45, 47 can be reciprocated along the frame 42 by a pair of hydraulic or pneumatic cylinders (not shown).

The structure 20 has two pairs of legs 50, 52 which are adjustable and lockable in the adjusted position and which engage the ground beneath the structure 20. Towards the front end of the structure 20, the frame structure 20 is preferably pivotally connected to a pair of adjustable arms 60, which are pivotally connected to a steel abutment plate (at 62). The plate 62 engages the earth at the face of the excavation from which the end of the host pipe 14 protrudes.

The die 12 is provided with means 64 by which lubricant (usually water) can be supplied to the pipe 10 upstream of the die 12 so that the interface of the pipe and the die is lubricated.

The legs 50, 52 are adjusted so that the pipe 10 enters the pipe 14 along a line coaxial with the central axis of the pipe 14 as far as possible.

The arms 60 are braced using pins (not shown) set in the appropriate holes 70.

The means 44 are in their released condition, so that the die 12 and the pusher means 40 can freely pivot about the axis of the pivot axis 22 and locked if preferred once the pipe is bent to the required extent and for the remainder of the operation. The means 44 are locked after the pipe bending apparatus has completed its use so that the apparatus can conveniently be handled for transportation purposes.

The structure 20 is designed to avoid bending the pipe 10 through an excessively tight bend radius which may cause permanent or excessive damage to the polyethylene material of the pipe 10. The structure 20 itself provides the reactions necessary to enable the bending of the pipe 10. Any net load experienced by the die due to pulling the pipe 10 through it is transferred by the structure 20 to the anchorage means 26 and thence to the pipe 14, or in part through the adjustable arms 60 to the abutment plate 62 engaging the face of the excavation.

The distance from the die 12 to the end of the pipe 14 is sufficient to provide for linear contraction of the polyethylene pipe after the release of tension in the drawing cable (not shown) attached to the nose cone (not shown) connected to the leading end of the pipe 10. This prevents the end of the pipe 10 from contracting into the pipe 14. The drawing cable is connected to a pulling winch (not shown) at the remote end of the pipe 14, which is exposed in a manner similar to that shown in FIG. 2 by an excavation in the earth.

The structure 20 is of inverted U-section, the mouth of the U facing the ground. The structure 20 is therefore open towards the ground, so that the structure 20 can be removed from the pipe 10 after the pipe 10 is severed immediately to the right of the die 12 as seen in FIGS. 1 and 2 and the structure 20 does not thereafter interfere with the end of the pipe 10, once the severed end of the pipe has been pulled through the die and the pusher. The structure 20 has side members to afford protection to personnel in the event of a failure of the pulling cable (not shown) or the pipe 10. A protective steel mesh grid 80 is provided on top of the structure 20 as a guard in the event of failure of the drawing cable or of the pipe 10.

Once the pipe 10 is under tension, all operations can be carried out without the need for personnel to enter the excavation. The frame as shown is designed to accommodate sizes of the pipe 10 from 14 inch up to 18 inch with a Standard Dimension Ratio of 17. The structure 20 can be modified to accommodate lighter wail 500 millimeter diameter pipe.

The pipe pusher 40 repeatedly grips the pipe 10 when its jaws 45, 47 are nearer to the die 12 and then the Jaws 45, 47 are moved away from the die 12. This assists the draw cable tension to pull the pipe 10 through the die 12 and also pushes the pipe 10 into the pipe 14. When the working stroke is completed, the half-cylinders are released and are then returned towards the die 12 (and past the pipe 10) ready for another cycle of operation.

In using the apparatus Just described, the pipe 10 is pulled towards the host pipe 14, the pulling cable (not shown) engaging the roller 29 at least initially. During this stage the roller 30 is in its upper retracted position which allows the nose cone (not shown) attached to the leading end of the pipe 10 to pass beneath the roller 30 until the leading end of the pipe 10 contacts the roller 28 and enters the pipe 14. Next, the roller 30 is adjusted to its lower, working position using the cylinder 34. The roller 34 presses downwardly on the upper surface of the pipe 10 and the pipe 10 is bent as shown owing to the upward reaction of the die 12 and the roller 28. The die 12 pivots about the axis 22 to allow such bending to occur and the frame 42 of the pipe pusher 40, which is rigid with the die 12, also swings about the axis 22.

The degree of bending of the pipe 10 and the setting of the legs 50, 52 allow the pipe 10 to enter the host pipe 14 along a line coaxial with the central axis of the pipe 14 as far as possible.

While the pipe 10 is advancing towards the host pipe 14 the tow cable engages the roller 29. At this stage the roller 30 is in its upper, retracted position. The nose cone engages the roller 29 and causes the tow cable to be moved downwardly as the cone runs on the roller 29, because of the inclined shape of the nose cone. When the roller 30 is moved to its lower, working position the pipe 10 is bent as shown and the pipe 10 engages the roller 28 at its under surface.

If during the entry stage of the advance of the pipe 10 into the host pipe 14 resistance should build up on the pipe, the pull on the tow cable increases and the pipe 10 separates from the roller 28. However, the pipe 10 can rise in the host pipe 14 only as far as the roller 29.

The rollers 28 and 29 ensure that the pipe 10 is always properly guided into the mouth of the host pipe 14. No excessive loads or bending moments are exerted on the host pipe 14 because they are sustained by the structure 20 and the leg 50 and 52. Furthermore, no excessive frictional loads are exerted upon the host pipe 14 or upon the plastic pipe 10 by virtue of the engagement of the roller 28 or the roller 29 with the pipe 10.

In the embodiment shown in FIGS. 1 and 2 the structure 20 sustains a compressive load as the pipe 10 is pulled through the die 12. Part of the load used to pass the pipe 10 through the die 12 is supplied by the pipe pusher 40 and that part is sustained by the frame 42 of the pipe pusher 40.

In the second embodiment shown in FIGS. 3 and 4, which is useful in a method of installing the plastic pipe as a loose liner in the host pipe a non-rotatable guide plate 100, which is profiled to accommodate the pipe 10, replaces the die 12. The plate 100 is mounted on a framework 102 which is shaped as an upright U and which is pivoted to the structure 20 about a horizontal axis 103. A profiled guide plate 104 replaces the roller 30 shown in FIGS. 1 and 2. A profiled guide plate 106 replaces the roller 28 shown on FIGS. 1 and 2.

Of course, each of the guide plates 100, 104 and 106 can be replaced by a profiled roller as shown in FIGS. 1 and 2 but for smaller diameter plastic pipes the guide plate can conveniently replace the roller, because the forces on the guides to induce bending in the pipe 10 will be smaller.

Figure 5:
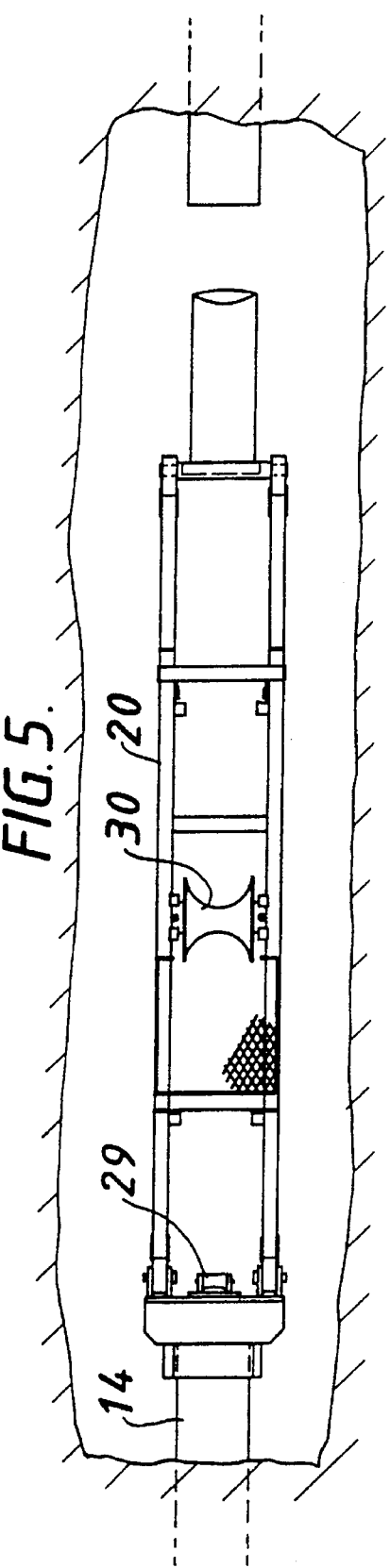
Figure 6:
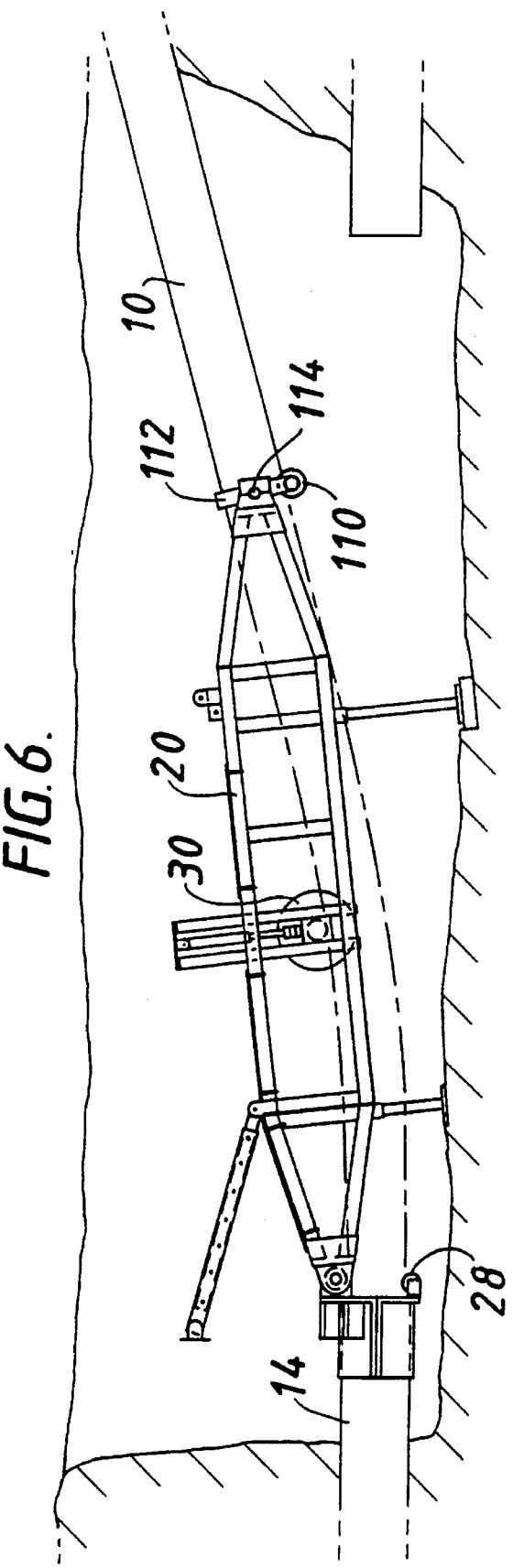

FIGS. 5 and 6 are similar to FIGS. 3 and 4 but show an embodiment useful for installing the pipe 10 as a loose liner in the host pipe 14 in which rollers are used as guides instead of plates. The leading guide roller 110 is mounted on a frame 112 which is shaped as an upright U and Journaled on the structure 20 about a horizontal axis 114.

The embodiments shown in FIGS. 7 and 8 and 9 and 10 correspond to the embodiments shown in FIGS. 3 and 4 and 5 and 6, respectively, so far as the use of profiled plates as guides and the use of roller guides is concerned. However, the embodiments shown in FIGS. 7 and 8 and 9 and 10 have pipe pushers similar to the pipe pusher 40 shown in FIGS. 1 and 2. In each case the pipe pusher 120 has a base frame 122 rigidly connected to the frame 124 on which the leading guide 100 or the leading guide roller 110 is mounted.

The construction and operation of the pusher 120 is exactly similar to that of the pusher 40. The pusher 120 is used to assist the winch (not shown) in passing the plastic pipe into the host pipe 14, although in the case of the embodiments shown in FIGS. 7 to 10, and in the case of the embodiments shown in FIGS. 3 to 6, the pipe 10 is intended to be a loose liner in the host pipe 14 and is not reduced in diameter by a die. In some cases, the loose liner may be passed into the host pipe 14 without a winch and pulling cable, the pipe 10 being advanced solely by the action of the puller 120.

What is claimed is:

1. Apparatus for a bending plastic pipe before it enters a host pipe comprising: a structure which is elongated in a direction in which, in use, a plastic pipe enters a host pipe and which has a first end and a second end; anchorage means for securing said elongated structure to an entry end of a host pipe and pivotally connected to said structure at said second end thereof about a first horizontal axis; first, second and third guides intended for engagement, respectively, with an under surface, a top surface and the under surface of said plastic pipe, said first guide being mounted on said structure at said first end thereof, said third guide being mounted on said anchorage means, and said second guide being mounted on said structure intermediate said first and third guides, said guides being profiled to accommodate said plastic pipe and said second guide being adjustable between an upper retracted position and a lower working position; and means connected to said structure engageable with the ground and adjustable for setting the inclination relative to the ground, of said structure about said first horizontal axis.

2. Apparatus according to claim 1 in which at least one of said guides comprises a roller rotatable about a horizontal axis transverse to said direction.

3. Apparatus according to claim 1 in which said first guide comprises a circular die mounted on said structure for rotation about a horizontal diametral axis.

4. Apparatus according to claim 3 further comprising a frame integral with said die and a pipe pusher mounted for reciprocable motion along said frame.

5. Apparatus according to claim 1 further comprising a frame integral with said first guide and a pipe pusher mounted for reciprocable motion along said frame.

* * * * *